Patented Feb. 16, 1937

2,071,282

UNITED STATES PATENT OFFICE 2,071,282

METHOD OF SEPARATING AMINO-ACIDS READILY SOLUBLE IN WATER AND AMMONIUM SULPHATE

Wilhelm Gluud and Walter Klempt, Dortmund-Eving, Germany, assignors to Bergwerksverband zur Verwertung von Schutz-rechten der Kohlentechnik G. m. b. H., Dortmund-Eving, Germany, a company of Germany No Drawing. Application March 4, 1935, Serial No. 9,284. In Germany May 18, 1934

3 Claims. (Cl. 260—122)

It is known to prepare amino-acids by hydrolysis of the corresponding amino-nitriles. Hitherto for the hydrolysis of amino-nitriles use has been made more especially of barium hydroxide. For laboratory purposes this procedure is simple and sure but its industrial employment is handicapped by the high price of the barium hydroxide and the enormous quantities of valueless barium sulphate obtained as waste product. The hydrolysis with sulphuric acid and the removal of this acid by treating the hydrolyzed mixture with lime is less simple and favourable results are obtained only if highly concentrated solutions of amino-nitriles are employed and at least sufficient sulphuric acid is added for the formation of a mixture of the bisulphate of the amino-acid and ammonium bisulphate. Moreover, on hydrolyzing the the solution of an amino-nitrile mixed with sulphuric acid care has to be taken that the whole of the mixture or even considerable portions thereof are not heated at once, since the hydrolysis starts very rapidly and in an explosion-like manner. The best mode of operation consists in causing the liquid mixed with sulphuric acid to pass slowly through a suitably heated passage apparatus, such as a serpentine tube or the like.

In these circumstances the hydrolysis with sulphuric acid and the removal of the sulphates by precipitation with lime causes no difficulties. The expenses are low; nevertheless the gypsum obtained is still a burdensome waste product.

Now it was found that the amount of lime required for the precipitation of the sulphuric acid is considerably decreased if after finishing the hydrolysis with sulphuric acid as described above such an amount of ammonia (in gaseous form or in the form of an aqueous solution) is added to the solution that the bisulphate of the amino-acid and the ammonium bisulphate are converted to free amino-acid and ammonium sulphate respectively. Under suitable conditions of concentration, a part of the ammonium sulphate is precipitated in solid form. This salt is filtered off and further gaseous ammonia is introduced into the filtrate, if need be, with cooling, until the liquid has absorbed 25% thereof. A second considerable crop of solid ammonium sulphate is obtained which is also filtered off. The amount of ammonium sulphate still present in the filtrate then only amounts to 10% of the original and may be removed in any favourable manner, such as by precipitation with $Ba(OH)_2$, $Ca(OH)_2$ or the like, and filtering off of the insoluble sulphate.

Furthermore, it has been found that the employment of lime for the removal of the last percentage of sulphate may be completely avoided by modifying the procedure described above in the following manner: An aqueous solution containing an amino-acid, such as glycine, and ammonium sulphate, is saturated with gaseous ammonia. The solid ammonium sulphate thus precipitated is separated and after driving out the ammonia the filtrate with a decreased content of ammonium sulphate is mixed with a fresh quantity of the original solution containing amino-acid and ammonium sulphate, the original volume of the liquid being restored according to the conditions of operation by evaporating or diluting with water. In this manner a solution is obtained which is saturated with ammonium sulphate but oversaturated with amino-acid from which a part of the pure amino-acid precipitates. This is filtered off and the filtrate again saturated with ammonia, the ammonium sulphate filtered off, the ammonia driven out of the filtrate, new mixture of amino-acid and sulphate (in solid form or in solution) added, the original volume restored as mentioned above, whereupon solid amino-acid is precipitated and filtered off, a further amount of sulphate precipitated by saturating the filtrate with ammonia again, and so on.

In this manner it is possible to separate the whole of the sulphuric acid directly as valuable ammonium sulphate merely by employing ammonia which is periodically driven out and used in the following charge for the precipitation of ammonium sulphate, thus being conducted in a circuit, avoiding completely the use of lime and the formation of gypsum, and obtaining the free amino-acid without any ancillary step.

In the process described above an aqueous solution of free amino-acid and ammonium sulphate is used as starting material. However, in the hydrolysis of amino-nitrile with the aid of sulphuric acid a solution is obtained in which the amino-acid and the ammonium are present in the form of their bisulphates. It would be possible to convert these bisulphates to free amino-acid and ammonium sulphate by neutralizing with ammonia and to subject the solution so obtained to the alternating treatment described in the foregoing paragraph.

Now the inventors have found further that this process is considerably simplified by starting from a mother liquid containing free amino-acid and ammonium sulphate into which new amounts of amino-acid and ammonium sulphate are introduced by adding directly the solution of the bisulphates of amino-acid and ammonium obtained upon the hydrolysis of the amino-nitrile with sulphuric acid and simultaneously or subsequently saturating the mixture with ammonia. In this manner a solution of free amino-acid and ammonium sulphate is directly obtained from which, owing to the presence of considerable amounts of free ammonia, the greater part of ammonium sulphate is precipitated and may be separated.

The following examples serve to illustrate the method according to the invention, it being understood that changes may be made without departing from the invention as covered by the appended claims which is not limited to any particular mode of operation.

*Example 1.*—500 grams of glycine and 500 grams of ammonium sulphate are dissolved with stirring at room temperature in 1300 cc. water whereupon the solution is saturated, with cooling (10° C.), with gaseous ammonia. 400 grams of NH$_3$ are absorbed and ammonium sulphate is precipitated which after being twice washed with 100 cc. of a saturated solution of ammonium sulphate for the purpose of removing the adherent mother liquid is practically free from glycine. 430 grams are obtained.

After having added the washing liquids to the mother liquid with reduced content of ammonium sulphate the ammonia is distilled off by heating said liquid, and used for another charge, if so desired. Now a mixture of 250 grams glycine and 250 grams ammonium sulphate are introduced into the liquid the volume of which is made up to the original by adding water, if required. After short stirring and cooling the liquid to about 20° C. the precipitated glycine is filtered off, twice washed with small amounts of a saturated glycine solution and then dried. 450 grams of glycine with a percentage of about 99.4 to 100% are obtained.

The mother liquid to which the washing liquids of the glycine have been added is saturated again with ammonia with cooling whereby a further crop of 288 grams ammonium sulphate (dry) is obtained with a percentage of 99.5 to 100%.

After expelling the ammonia from the filtrate and introducing a mixture of 250 grams glycine and 250 grams ammonium sulphate, 260 grams of solid glycine are recovered.

In this manner the alternating precipitation of ammonium sulphate by saturating the liquid with ammonia and the precipitation of glycine by introducing new mixture of glycine and ammonium sulphate may be repeated as frequently as desired.

For the washing of each of the separated substances several series of washing liquids are successively employed, the liquid first used being returned to the respective mother liquid because it is practically a solution saturated with glycine or ammonium sulphate respectively. For the final washing a little water is used in each of the series. By this proceeding the removal even of the last percentages of impurities and adherent mother liquid is ensured whereby the liquids keep their washing effect.

Possible differences in the volume are compensated by adding water suitably carried out before the introduction of the ammonia or after the introduction of the mixture of animo-acid and ammonium sulphate. Instead of using the amino-acid and the ammonium sulphate in solid form an aqueous solution of said substances may be used of course; in this case the amount of water introduced with the solution must be removed by evaporating.

It is advantageous to profit by the differently increasing solubility of the substances in water with rising temperature, as is done to a certain extent in the manner of operating according to the foregoing example. As the solubility of the ammonium sulphate increases more rapidly with rising temperature than does that of the amino-acid, it is possible to carry out the precipitation of the ammonium sulphate at lower temperature, thus further reducing the solubility of this salt already reduced by the introduction of ammonia. If now after driving off the ammonia and adding new mixture of the two substances the precipitation of the amino-acid is carried out at higher temperature, the solution of reduced content of ammonium sulphate inclines in a higher degree to dissolve the salt so that it is possible to separate even greater proportions of the components of the mixture than those mentioned in the example, employing the same volumes of liquid. It is evident, therefore, that the amounts to be worked may be the larger the greater the difference of the temperature at which the respective precipitations are carried out.

In the same manner a greater difference of the temperatures should be aimed at if mixtures rich in ammonium sulphate are to be separated.

On the other hand it will be desirable to carry out both precipitations at the same temperature if mixtures poor in ammonium sulphate are to be treated. In the case of mixtures extremely poor in ammonium sulphate the temperature at which the glycine is precipitated should be even lower than that at which the precipitation of the sulphate takes place.

*Example 2.*—A mixture of 500 grams alanine and 500 grams ammonium sulphate is dissolved with stirring in 2000 to 3000 ccs. water. This solution is saturated with gaseous ammonia with permanent cooling whereby at the end of the operation a temperature of 10 to 15° C. is maintained. The ammonium sulphate precipitated is filtered off and, for the purpose of removing the adherent mother liquid, twice washed with 100 cc. of saturated ammonium sulphate solution. 390 grams of pure ammonium sulphate are obtained.

After adding the washing liquids to the mother liquid the ammonia is driven off by heating and added to another charge to precipitate ammonium sulphate, and a new mixture of 250 grams alanine and 250 grams ammonium sulphate is introduced into the mother liquid. A difference of the original volume, if any, is corrected in the manner already mentioned. Subsequently, the liquid is allowed to cool to 20° C. with stirring whereupon the precipitated alanine is filtered off and twice washed with 100 cc. of a saturated alanine solution. 420 grams alanine are obtained free or nearly free from sulphate.

The washing liquids of the alanine are added to the mother liquid which is again saturated with ammonia with cooling. 350 grams ammonium sulphate with a percentage of 99.6 to 100% (after washing) are precipitated.

After distilling off the ammonia and adding a further 500 grams of the above named mixture 250 grams alanine with a percentage of about 99.6% are obtained.

*Example 3.*—A pure aqueous solution containing 10% alanine and 12% ammonium sulphate is used as starting material, this solution having been obtained by hydrolyzing amino-propionitrile with sulphuric acid and subsequently treating the hydrolyzed solution with ammonia to remove the bulk of ammonium sulphate.

2500 cc. of this solution (containing 250 grams alanine and 300 grams ammonium sulphate) are introduced into a mother liquid (prepared according to Example 2) from which ammonium sulphate has been removed by saturating with ammonia, filtering and distilling off the ammonia. The liquid so obtained is evaporated until the original volume is restored and cooled to 25 to 30° C. whereupon the alanine is filtered off and washed as described. After drying pure alanine is obtained.

After having been mixed with the washing liquids employed in the first series, the mother liquid is reduced to its original volume and saturated with ammonia. In this way the entire amount of the ammonium sulphate introduced (at about 300 grams) is recovered and after being washed with the washing liquids employed in series is obtained in pure condition.

Then the ammonia is driven off again with simultaneous or subsequent introduction of the alanine-ammonium sulphate solution, evaporation of the water thus introduced and so on.

Example 4.—A solution containing ammonium sulphate and glycine is mixed with cooling, stirring and introducing of ammonia (whereof a part may be employed as aqueous ammonia) with a solution containing the bisulphates of glycine and ammonium. According to the quantity of the water contained in the mixture (which should be kept as low as possible) 90% of the entire amount of ammonium sulphate present in the solution may be precipitated if the introduction of ammonia is continued to saturation, i. e. a percentage of 20 to 25% of determinable free ammonia. The ammonium sulphate is separated from the solution rich in NH3 with the aid of a closed centrifuge and repeatedly washed with water. Among the washing liquids employed in series, that which is first used and the richest in ammonium sulphate, is returned into the circuit before the introduction of ammonia.

Subsequently the ammonia is driven out of the solution which now contains only a few per cent of ammonium sulphate and introduced into a new charge ready for saturation with NH3. The liquid freed of NH3 is at room temperature a solution with reduced content of ammonium sulphate but nearly saturated with glycine. To recover the glycine this solution is now evaporated (suitably under vacuo) to the point in which the percentage of ammonium sulphate is still sufficiently far from the limit of solubility. During the evaporation of the water and especially on cooling almost pure glycine containing mere traces of ammonium sulphate from the adherent mother liquid is precipitated. It may be converted to pure glycine by washing with the washing liquids employed in series, the first of which as the richest in glycine being returned to the vaporizer, or by re-crystallizing.

The solution obtained after the separation of the glycine is returned as a mother liquid to the process and mixed with a new charge of the solution of bisulphates with neutralizing and saturating with ammonia.

In general the solution of the bisulphates introduced into the mother liquid is somewhat discoloured and contains small amounts of impurities resulting from the process of preparation. The mother liquid, of course, slowly grows rich in these discoloring impurities which on the one hand need the occasional employment of purifying carbon or on the other hand a removal after a longer use of the liquid. This removal is carried out in the simplest manner by evaporating the filtrate separated from the solid amino-acid so long as crystals are formed. The syrupy residue is rejected and the mixture of crystals consisting of glycine and ammonium sulphate added to the solution of bisulphates and treated with ammonia.

Instead of carrying out the purification of the mother liquid after working numerous charges of the bisulphates, i. e., after a strong enrichment in impurities preventing the precipitation of pure glycine, the purification by evaporating the liquid may be also carried out after each single precipitation of amino-acid, whereupon the syrupy residue is drawn out of the circuit and the mixture of crystals—if need be, after dissolving in water, for which purpose the washing liquids obtained from the washing of the ammonium sulphate may be directly employed—is added to the solution of the bisulphates and saturated with ammonia.

The removal of the ammonia from the solution freed of the solid ammonium sulphate is either carried out in a heated passage apparatus or in a heated stirring vessel into which, in order to facilitate the exhalation of the ammonia, air or steam may be blown. In the case of steam the amount of water condensed in the liquid must also be evaporated before precipitating the glycine.

The last traces of ammonia can only be removed from the solution by stronger heating, this treatment being not suitable for certain amino-acids and being in addition uneconomical. On leaving this residue of ammonia in the solution it would be driven out during the vaporization necessary in the precipitation of the glycine so that only very diluted aqueous ammonia is obtained which in some degree is fit as washing liquid for washing out the ammonium sulphate. However, it was found to be better practice to neutralize the residue of ammonia in the liquid after distilling off the bulk of the ammonia by adding small amounts of the solution of bisulphates so that a neutral solution which contains only amino-acid and ammonium sulphate is led to the vaporizer.

What is claimed as new is:

1. A method of separating amino-acids readily soluble in water from ammonium sulphate which consists in alternatingly carrying out the following operations, namely, on the one hand saturating an aqueous mother liquid containing an amino-acid and ammonium sulphate with ammonia, separating the precipitated ammonium sulphate and distilling off the free ammonia, and on the other hand introducing a mixture of the amino-acid and ammonium sulphate into the liquid freed from ammonia, separating the solid amino-acid, and returning the remaining mother liquid to the process.

2. A method according to claim 1, which consists in carrying out the introduction of a mixture of the amino-acid and ammonium sulphate into the liquid freed from ammonia by adding an aqueous solution containing the bisulphate of the amino-acid and ammonium bisulphate to said liquid, adding an amount of ammonia sufficient to set free the amino-acid and to produce neutral ammonium sulphate, and vaporizing the amount of water introduced by the aqueous solution of the aforesaid bisulphates.

3. A method of separating amino-acids readily soluble in water from ammonium sulphate which consists in alternatingly carrying out the following operations, namely, on the one hand adding an aqueous solution containing the bisulphate of the amino-acid and ammonium bisulphate to an aqueous mother liquid containing an amino-acid and ammonium sulphate, saturating the liquid so obtained with ammonia, separating the precipitated ammonium sulphate and distilling off the excess of ammonia, and on the other hand vaporizing the amount of water introduced by the aqueous solution of the aforesaid bisulphates, cooling the liquid, separating the precipitated amino-acid, and returning the remaining mother liquid to the process.

WILHELM GLUUD.
WALTER KLEMPT.